US012748973B2

(12) United States Patent
Chai et al.

(10) Patent No.: US 12,748,973 B2
(45) Date of Patent: Sep. 29, 2026

(54) NEURAL NETWORK OPTIMIZATION USING KNOWLEDGE REPRESENTATIONS

(71) Applicant: Latent AI, Inc., Menlo Park, CA (US)

(72) Inventors: Sek Meng Chai, Princeton, NJ (US); Jan Ernst, Princeton, NJ (US); Abelardo Lopez-Lagunas, Princeton, NJ (US); Ryan M. Dailey, New Brunswick, NJ (US)

(73) Assignee: LATENT AI, INC., Menlo Park, CA (US)

( * ) Notice: Subject to any disclaimer, the term of this patent is extended or adjusted under 35 U.S.C. 154(b) by 736 days.

(21) Appl. No.: 18/185,636

(22) Filed: Mar. 17, 2023

(65) Prior Publication Data

US 2023/0297835 A1 Sep. 21, 2023

Related U.S. Application Data

(60) Provisional application No. 63/320,941, filed on Mar. 17, 2022.

(51) Int. Cl.
*G06N 3/082* (2023.01)

(52) U.S. Cl.
CPC .................................... *G06N 3/082* (2013.01)

(58) Field of Classification Search
None
See application file for complete search history.

(56) References Cited

U.S. PATENT DOCUMENTS

| | | | | |
|---|---|---|---|---|
| 11,423,283 | B1 * | 8/2022 | Lupesko | G06N 3/04 |
| 11,797,876 | B1 * | 10/2023 | Wang | G06N 3/0464 |
| 2019/0354849 | A1 * | 11/2019 | Tran | G06N 3/006 |
| 2020/0334539 | A1 * | 10/2020 | Wang | G06F 18/241 |
| 2020/0364612 | A1 * | 11/2020 | Siravara | G06N 20/00 |
| 2021/0019652 | A1 * | 1/2021 | Gadelrab | G06N 20/00 |
| 2021/0067173 | A1 * | 3/2021 | Miele | H03M 13/09 |
| 2021/0089921 | A1 * | 3/2021 | Aghdasi | G06N 3/09 |
| 2021/0189499 | A1 * | 6/2021 | Deng | A61K 31/00 |
| 2021/0334693 | A1 * | 10/2021 | Bavly | G06F 16/24578 |
| 2021/0374130 | A1 * | 12/2021 | Lavi | G06F 16/2455 |
| 2021/0390033 | A1 * | 12/2021 | Singhal | G06N 3/0985 |
| 2022/0318686 | A1 * | 10/2022 | Rajagopalan | G06N 5/04 |
| 2022/0391703 | A1 * | 12/2022 | Sanchez | G06N 3/088 |
| 2023/0064500 | A1 * | 3/2023 | Acharya | G06F 9/5038 |
| 2023/0169329 | A1 * | 6/2023 | Ramos | G06F 17/18 706/25 |
| 2023/0297835 | A1 * | 9/2023 | Chai | G06N 3/0495 706/25 |

FOREIGN PATENT DOCUMENTS

| | | | | |
|---|---|---|---|---|
| CN | 114365123 A | * | 4/2022 | G06N 3/0464 |
| KR | 20210058404 A | * | 5/2021 | G06N 3/0985 |

* cited by examiner

*Primary Examiner* — Hasanul Mobin
(74) *Attorney, Agent, or Firm* — Heath M. Sargeant; Holland & Knight LLP

(57) ABSTRACT

Systems, tools and methods are provided for optimizing neural networks (NNs) to run efficiently on target hardware such as central processing units (CPUs), graphics processing units (GPUs), digital signal processors (DSPs), etc. The provided software tools are implemented as part of a machine-learning operations (MLOps) workflow for building a neural network, and include optimization algorithms (e.g., for quantization and/or pruning) and compiler processes that reduce memory requirements and processing latency.

18 Claims, 7 Drawing Sheets

NEURAL NETWORK OPTIMIZATION USING KNOWLEDGE REPRESENTATIONS

This application claims priority under 35 U.S.C. § 119(e) to U.S. Provisional Application Ser. No. 63/320,941, which was filed on Mar. 17, 2022 and is hereby incorporated by reference.

BACKGROUND

This disclosure relates to the field of artificial intelligence. More particularly, embodiments disclosed herein provide for optimization of a neural network (NN).

A neural network in a type of machine-learning model that mimics the manner in which a human brain operates, and comprises a collection of interconnected software and/or hardware processing nodes that are similar to neurons in the brain. Nodes receive input data and use their logic to determine what value or other information, if any, to pass forward to other nodes. A NN may be trained with labeled training data that allows the processing nodes to learn how to recognize particular objects, classify or cluster data, identify patterns, identify an entity that differs from a pattern, etc.

Nodes are organized into layers, with those in each layer receiving their input data from a preceding layer and feeding their output to a subsequent layer. The greater the number of layers and the number of nodes within a layer, the more powerful the NN becomes, but the complexity increases commensurately. For example, the greater the number of nodes a neural network contains, the longer it takes to properly train the network.

Traditionally, optimization of a neural network is a serial process that includes a design stage and a tuning stage that are mutually dependent. For example, in the design stage a machine-learning expert will first explore some number of NN model designs and train them for accuracy. Only after the expert selects a model will a machine-learning engineer begin efforts to tune the model (e.g., for speed and power). Based on the engineer's efforts, the expert may need to revise the model or the training method. Because the efforts of the expert and the engineer are dependent upon each other, the optimization process can take a significant length of time until a solution is obtained that satisfies applicable criteria, during which one or the other of the expert and engineer, and their resources, may be idle.

Thus, there is a need for a system and method for expediting the process of optimizing a neural network.

SUMMARY

In some embodiments, systems and methods are provided for enabling independence between workflows involved in the process of optimizing a neural network (NN) or other machine-learning model. More particularly, machine-learning engineers determine which of multiple models or model variants successfully satisfy applicable hardware constraints (e.g., in terms of speed and power). Meanwhile, machine-learning experts train only the successful models and/or variants, and evaluate them for accuracy. Thus, optimization for accuracy and optimization for latency (or speed and power) can proceed in parallel.

Moreover, unlike traditional optimization techniques in which a single NN model is optimized first for accuracy and then for speed and power, in some embodiments disclosed herein multiple different models or model variants may be in flight simultaneously since the optimization process is bifurcated into two independent stages. In addition, instead of working with a static hardware model or architecture, in some embodiments the architecture may evolve in response to evaluation of the various models and model variants.

In these embodiments, multiple variants of a selected machine-learning model (e.g., a neural network) are derived by modifying the model in some unique manner (e.g., to eliminate nodes, to prune channels). Each variant may be optimized in some manner, via quantization for example, to reduce its complexity and/or footprint, and is compiled to produce a runtime artifact. The variants are then tested (e.g., for latency, speed, and/or power) on a selected hardware architecture mimicked by a selected set of embedded hardware devices.

Only those variants that satisfy specified criteria in the latency evaluation are subsequently trained and then tested for accuracy. In parallel with this accuracy evaluation, other variants of the same model, or some variants of a different model, may undergo preparation for and execution of the latency evaluation.

Results of the latency and accuracy evaluations are saved, perhaps to a knowledge database. The knowledge database can therefore serve as a data repository for users (e.g., machine-learning experts and/or engineers) to use to examine the results, select models or variants for continued testing, identify optimizations that are particularly effective (or ineffective), etc.

In some embodiments, an analytics module infers or predicts the results of one evaluation of a model variant or set of variants (e.g., accuracy evaluation) based on the results of one or more other evaluations (e.g., the latency evaluation).

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, tools and processes are provided for efficiently optimizing the operation of a neural network (NN) for execution on a target set of hardware resources. These embodiments attempt to avoid a NN generation workflow in which one stage or operation is stalled while awaiting a result from another stage.

Figure 1:
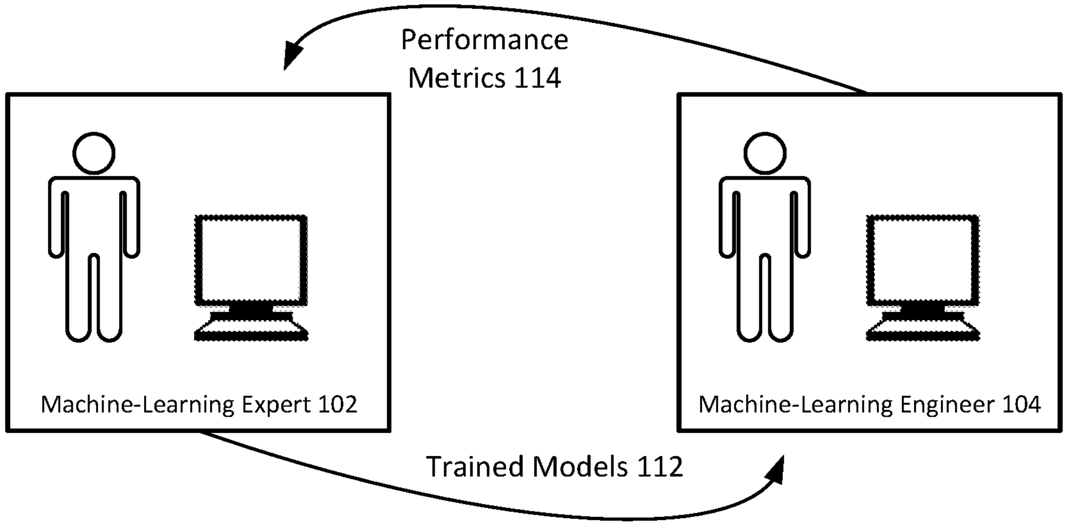
FIG. 1 Prior art
FIG. 1 is a block diagram depicting a standard approach to improve a neural network.

FIG. 1, for example, depicts a standard approach to neural network optimization. In this traditional method, a machine-learning (ML) expert 102 will engage in a "design and explore" stage to train a NN model for accuracy. Only when satisfied with the results will expert 102 forward one or more trained models 112 to machine-learning engineer 104. ML engineer 104 performs a "train and optimize" stage for the models on a set of selected hardware. More specifically, the ML engineer will tune the model for speed and power, and return a set of performance metrics 114 to ML expert 102, and the process iterates until a desired solution meets all desired performance metrics.

This standard approach thus creates and enforces a co-dependence between the ML expert and the ML engineer. As one result, training complex models on large datasets can take days (if not weeks) on a dedicated cluster of GPUs. In addition, because the ML engineer may have to wait for each trained model, hardware resources are idle and unproductive in between each iteration.

Figure 2:
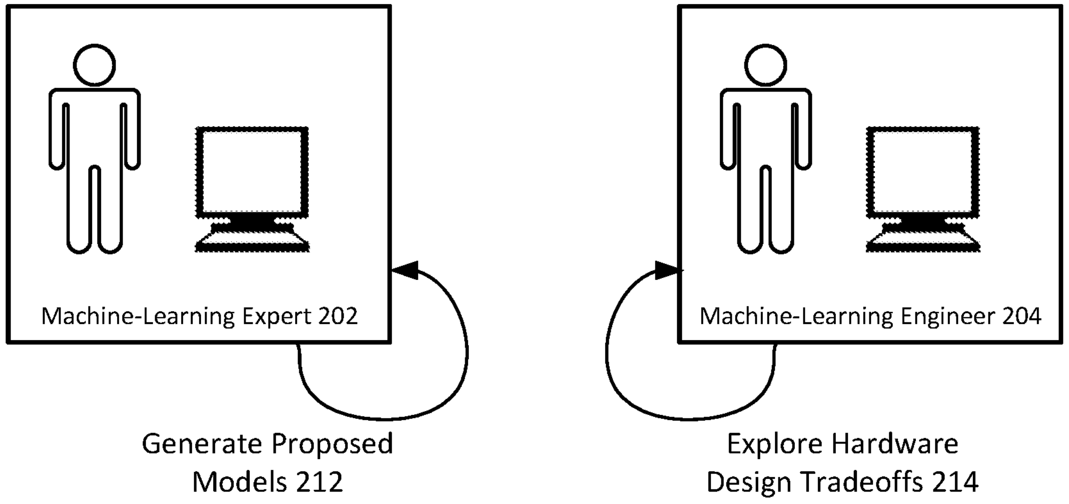
FIG. 2 is a block diagram depicting optimization of a neural network using independent workflows in accordance with some embodiments.

In contrast, FIG. 2 is a block diagram depicting optimization of a neural network in accordance with some embodiments. In these embodiments, the optimization process features independent workflows, wherein both ML expert 202 and ML engineer 204 can work independently on their respective tasks. While ML expert 202 generates 212 one or more proposed models, ML engineer 204 explores hardware design tradeoffs associated with the target hardware. Thus, in this new approach, NN models and/or variants are proposed for an ML engineer to explore, while the ML expert trains only model variants that meet hardware constraints (e.g., speed and power).

One challenge faced while optimizing a neural network involves convergence upon an optimal solution. In the standard approach shown in FIG. 1, the inter-dependent process continues to iterate between the ML expert and the ML engineer until a solution meets the desired criteria. This can be a long process due to the plethora of design parameters that must be explored. Very often, the ML expert relies on hardware models that can be used in conjunction with the NN architecture search (NAS). However, different hardware models must be employed for each different target platform or system, and a given hardware model may or may not be accurate. In contrast, in the independent process of FIG. 2 no explicit hardware models are required.

Figure 3:
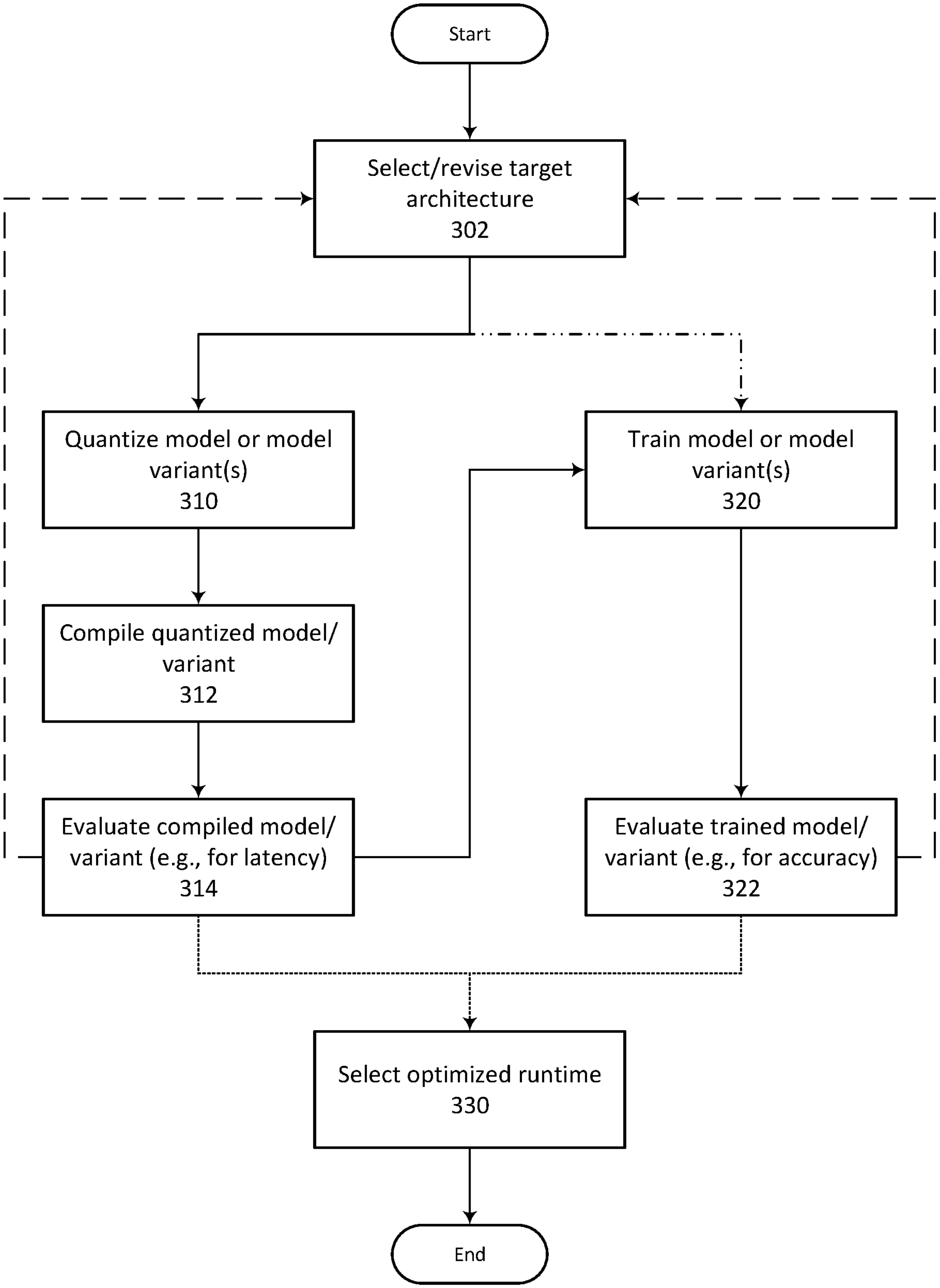
FIG. 3 is a flowchart illustrating a method of training and optimizing a neural network using compiled runtimes, according to embodiments reflected in the block diagram of FIG. 2.

FIG. 3 is a flowchart illustrating a method of training and optimizing a neural network using compiled runtimes, according to embodiments reflected in the block diagram of FIG. 2. In these embodiments, evaluation is done separately within parallel workflows, which means training can be performed in parallel with quantization and compilation. In the flowchart of FIG. 3, solid lines indicate principal paths of processing, while dashed lines indicate alternative paths (e.g., after a model fails an evaluation). The dotted lines indicate final processing (after an optimized and trained model passes all evaluations).

In operation 302, neural network architecture selection occurs, which involves selecting target hardware resources, and/or configurations of such resources, for operation of the optimized neural network. Thus, a type of processor (e.g., CPU, DSP, GPU) may be selected, a memory configuration may be chosen, etc.

It should be noted that, when processing returns to operation 302 after failed evaluation of a model for accuracy or latency, for example, feedback associated with the failed evaluation may lead to a change in the neural network architecture and/or target hardware selection criteria. Specifically, the target hardware model may be based on immediate results of a recent evaluation and/or results of past evaluations.

Following operation 302, the process splits into parallel workflows corresponding to workflows 212, 214 of FIG. 2. Thus, selection of the target architecture is followed by operations 310 and 320.

In operation 310, one or more models or model variants are quantized (e.g., for size and speed of execution). In a first iteration of this operation, if no models are yet available that have been successfully evaluated for accuracy (and/or other performance metrics), a first set of tentative neural network model variants is assembled and quantized, wherein each variant is a derivative model configured from a base NN model architecture. For example, a model variant may be produced by strategically pruning a few channels to reduce the size of the model. In subsequent iterations, quantization may be performed only on model variants that have passed evaluation for accuracy (in the parallel workflow).

In operation 312, the quantized model/variant is compiled by generating a set of operations to run on the target hardware. The selected operations are based on the results of operation 310, whereby the models are processed (e.g., quantized) for size and speed of execution.

In operation 314, an executable runtime produced from operation is evaluated for latency. If it satisfies the applicable latency threshold and/or other performance metrics, it begins training via operation 320. In different embodiments, the runtime's performance evaluation may examine different metrics in addition to or instead of latency, such as inference speed, storage size, power, and memory bandwidth. The evaluation of operation 314 may be performed on target hardware.

In operation 320, training of one or more NN models or model variants occurs (e.g., by ML expert 202), as in workflow 212 of FIG. 2. As in operation 310, during a first iteration, if no models are yet available that have been successfully evaluated for latency (and/or other performance metrics), a first set of tentative neural network model variants may be assembled and trained. In subsequent iterations, training may be performed only on model variants that have passed evaluation (in the parallel workflow) for applicable performance metrics (e.g., latency, speed, size, power).

In operation 322, the trained models/variants are evaluated for accuracy. Processing returns to operation 302 for those models that meet the accuracy threshold, accompanied by feedback from the evaluation, while others that do not pass may return to operation 320 or may be abandoned. When a given model or variant passes the evaluations in each workflow, it will pass to operation 330. In different embodiments, a trained model's evaluation may examine different metrics in addition to or instead of accuracy, such as training time and configuration (e.g., depth and/or width).

Thus, in the method depicted in FIG. 3, experiments evaluating multiple models for accuracy and latency (and/or other criteria) can run in parallel, which allows model selection to be guided by a large set of partial testing results. As one illustrative benefit, the ML expert performing training need not train all model variants, but rather just those that meet the applicable latency threshold. This helps reduce overall training time, and can provide higher level of performance (e.g., speed) guarantees because latency is tested earlier in the overall process.

After passing evaluations in operations 314 and 322, in operation an optimized runtime is produced that has passed evaluation for all desired performance metrics, possibly in parallel.

A key aspect of the illustrated method is that the feedback from some or all evaluations helps drive the NN architecture selection. Thus, partial results are evaluated on the target hardware and then used to train selected models. In other words, the workflow is data-driven based on the current NN model/variant and previous results. In contrast, the traditional approach shown in FIG. 1 would proceed linearly through successive stages involving architecture search, training, quantization, compilation and evaluation. Hardware changes would be considered only after the evaluation phase, which could require the entire pipeline to be repeated an indefinite number of times, with new or updated hardware models needed for each change.

Figure 4:
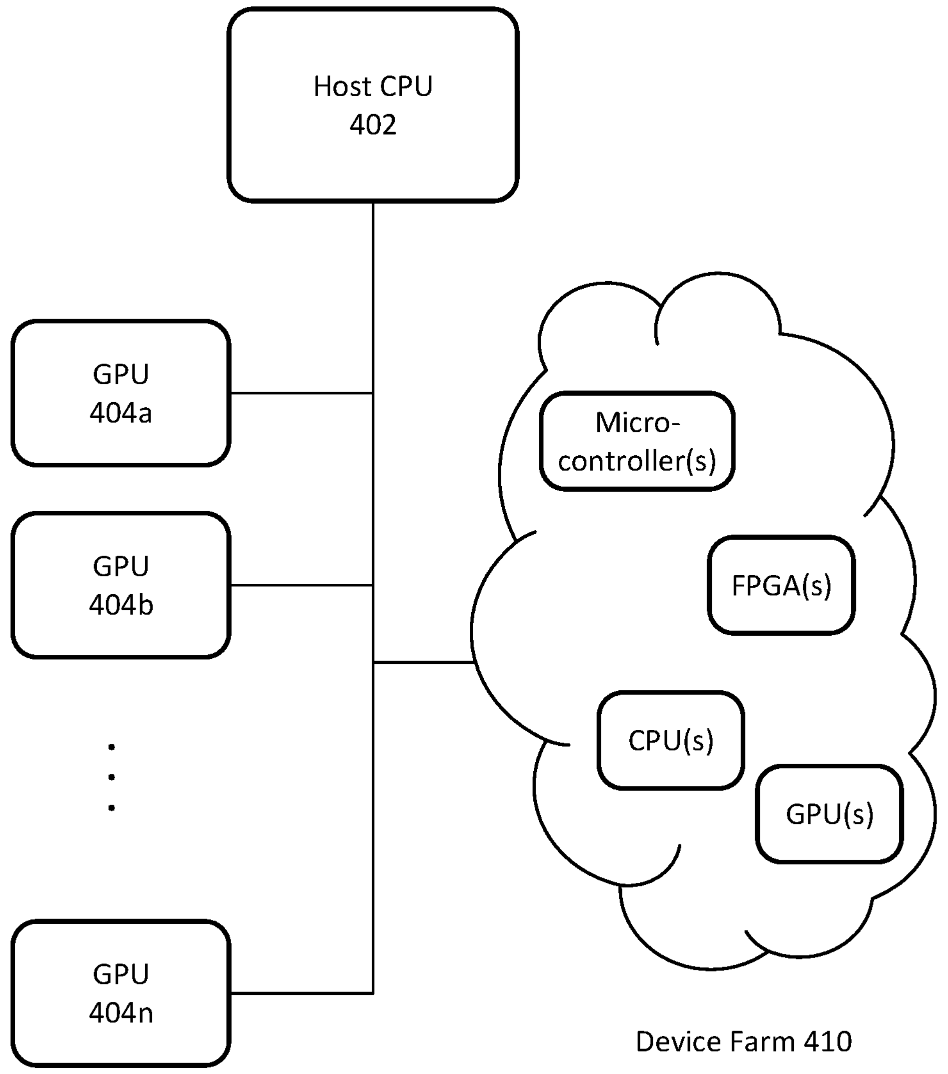
FIG. 4 is a hardware block diagram that illustrates the flexibility of architecture selection for executing an optimized neural network runtime, in accordance with some embodiments.

FIG. 4 illustrates the flexibility of architecture selection for executing an optimized neural network runtime, according to some embodiments. One of ordinary skill in the art will appreciate that a standard system for optimizing a neural network (e.g., according to the process depicted in FIG. 1) typically includes a host processor or CPU connected to a cluster of GPUs (Graphics Processing Units). The GPUs are used for training while the host CPU performs optimization operations. The host CPU may be coupled with a target hardware platform for evaluating models. In this type of system, a relatively large number of GPUs is required because of the greater number of model architectures that must be trained (i.e., not just those that pass an optimization evaluation).

In contrast, and as shown in FIG. 4, embodiments disclosed herein for generating an optimized neural network employ host CPU 402, a limited number of GPUs (GPUs 404*a*-404*n*), and device farm 410, which may comprise any type and mix of embedded devices (e.g., GPUs, CPUs, FPGAs or field programmable gate arrays, micro-controllers, etc.). In these embodiments, components of the device farm are used to evaluate models with respect to latency and/or other performance metrics. Due to the flexibility of this evaluation phase, many models can be eliminated from consideration, thereby reducing the number that proceed to the training workflow. Those models that do pass this first evaluation phase proceed to be trained on GPUs 404. Meanwhile, host CPU 402 supervises the parallel optimization and training workflows.

Figure 5:
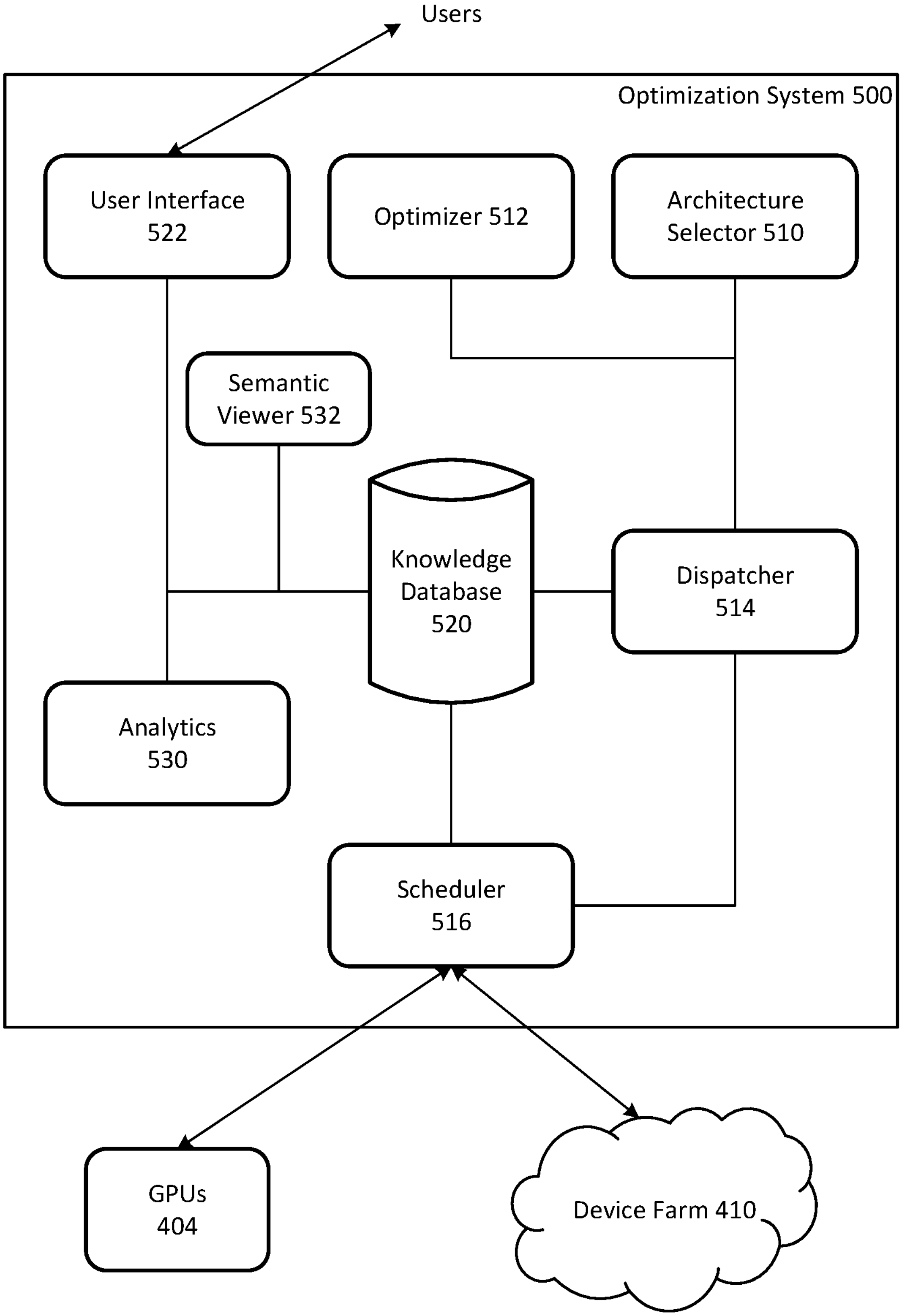
FIG. 5 is a block diagram illustrating a system for optimizing a neural network, in accordance with some embodiments.

FIG. 5 is a block diagram illustrating a system for optimizing a neural network, according to some embodiments, and may incorporate or interact with some or all the hardware components of FIG. 4.

Within system 500, model architectures (e.g., Yolo, SSD, EfficientDet) and optimization schemes (e.g., quantization, pruning, distillation) are selected in order to produce neural network model variants, by architecture selector 510 and optimizer 512, respectively. Dispatcher 514 selects model variants to process and evaluate, and notifies scheduler 516 accordingly. Scheduler 516 organizes and schedules the respective tasks on GPU cluster 404 (e.g., for training) or device farm 410 (e.g., for performance evaluation). Results of the tasks executed by scheduler 516 are stored in knowledge database (KDB) 520.

In addition to evaluation results (e.g., accuracy, latency, power, memory requirements, bandwidth, batch size, target hardware configuration), KDB may also store model configuration data (e.g., hyperparameters, tuning parameters, layers, executable code for executing a model). The knowledge database may therefore be used for various purposes, including interaction with users (e.g., machine-learning exports and/or engineers) via user interface 522.

In some embodiments, dispatcher 514 automatically proposes, generates, and partially evaluates model variants to populate the KDB with useful data over time. This automation may be achieved by any means of optimizing one or more user-specified target objectives (e.g., model performance, size, speed), such as random search, grid search, Bayesian optimization and genetic algorithms. One example of this automation is guided by a user-specified policy that governs the selection of new variants (e.g., to limit the search space).

Analytics module 530 draws upon data stored in KDB 520 to visualize evaluation results, display performances of different models/variants, and/or present other data. These data may illustratively assist in the selection and/or design of additional NN configurations. In some embodiments, analytics module 530 is used to predict and infer details that are not yet complete in a candidate neural network' partial evaluation results. For example, in one iteration, a NN model variant may be optimized (quantized and compiled) and evaluated on the device farm for performance (e.g., speed, size, power), with these results being stored in the KDB. The results are only partial because they lack the accuracy component that is generated only after some training. Thus, the analytics module can be used to predict and infer incomplete results to help a user and the system guide the next workflow iteration. Semantic viewer 532 produces visualizations for users by translating between the data domain of KDB 530, which may feature high dimensionality, and a user domain in which the data may be displayed for human perception.

In some implementations, scheduler 516 maintains a priority list of jobs that may include quantize-compile-evaluate tasks (i.e., sequentially quantize, compile, then evaluate a specified model), train-evaluate tasks (i.e., train and then evaluate a specified model), and/or others. Scheduler 516 therefore keeps the hardware busy running batches of evaluations to gather partial results, and may reprioritize jobs to maintain efficiency of memory loading, caching, and processing of models and evaluation datasets.

Thus, as discussed previously, multiple NN model variants are simultaneously in flight at any given time, and may be evaluated to yield complete or partial results. KDB 520 is constantly updated with these results, which are used to help determine the next workflow iteration for training or optimizing an NN model. Also, changes to architectures may be specified in a structured fashion, for instance with a domain-specific language (DSL), to allow existing architectures (including empty or identity architectures) to be changed incrementally and/or recombined in such a way that the KDB captures sufficient data and relations to elicit knowledge. An example of this knowledge may be: "What changes in a model architecture would improve a target objective most across different model families?"

In some embodiments, analytics module 530 produces knowledge graphs, embeddings, and machine-learning tasks. Knowledge graphs are data structures consisting of nodes/entities and relations between them, wherein each node represents the results (partial or complete) of a neural network evaluation.

Figure 6A:
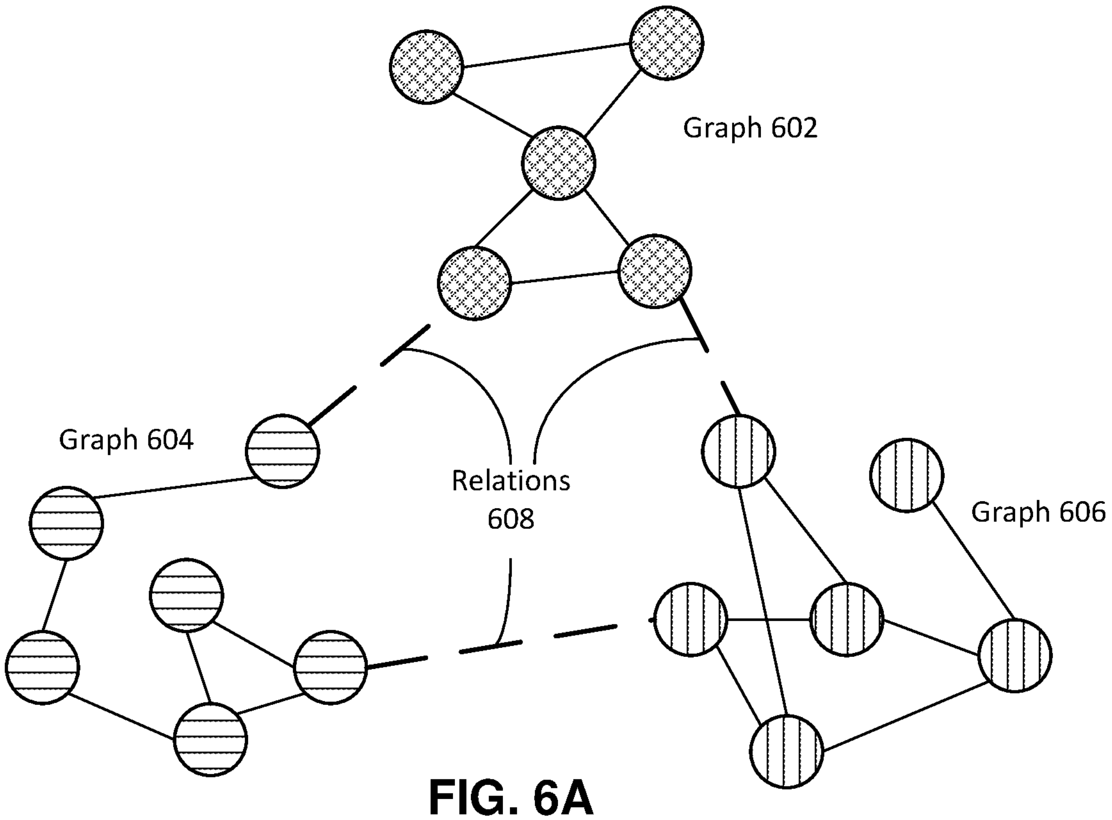
FIGS. 6A-B illustrate knowledge graphs and associated embeddings that may be produced by an analytics module, in accordance with some embodiments.
Figure 6B:
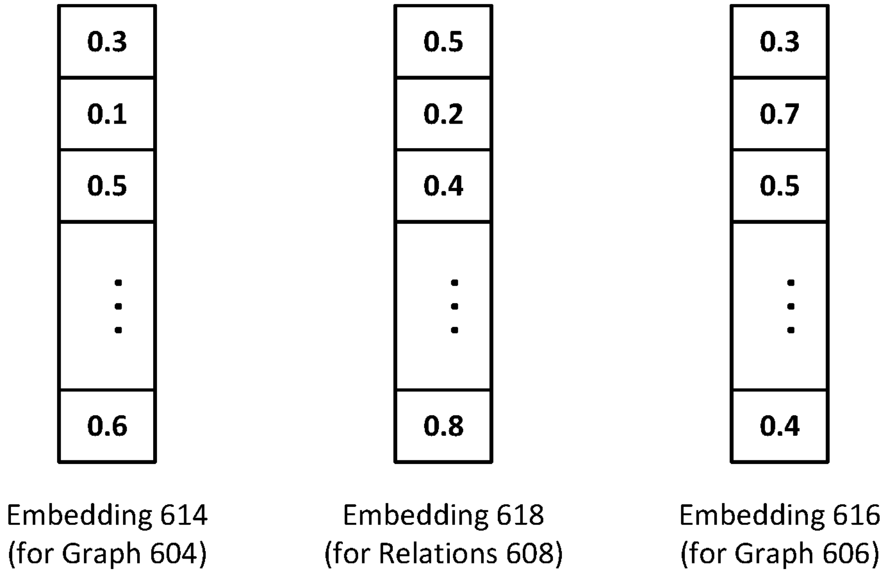

FIGS. 6A-B illustrate knowledge graphs and associated embeddings that may be produced by an analytics module, according to some embodiments. As shown, when visualized for a user (e.g., via user interface 522 of system 500), evaluations may be clustered and colored (or otherwise differentiated, such as with hatching as shown in FIG. 6A) based on a particular experiment around a NN model variant and the corresponding optimizations. Thus, graphs 602, 604, and 606 depict results of evaluations of three variants of a neural network model. A cluster (or graph) also contains partial results for entries that may include, but that are not limited to, model type, hyperparameters, tuning parameters, layers, accuracy, latency, power, memory storage, bandwidth, batch size, and target hardware. Relations 608 correspond to correlations between different graphs.

Embeddings 614, 616, and 618 of FIG. 6B are connections between clusters of results with associated weights, and are used to build correlations between clusters. For example, similar target hardware configurations or model variants may have a stronger connection (and associated weights in the embeddings). The embeddings comprise weighted correlations between entities.

Based on knowledge graphs and associated embeddings, machine-learning tasks find patterns in the embeddings to provide an inference to the partial results. Therefore, given a dataset, we can find the best model variant, optimization, and target hardware that could achieve some threshold accuracy, while remaining within a desired performance (speed, size, power) spectrum. The ML tasks illustratively consist of algorithms (e.g., decision trees) that can be used to make an inference on a projected value. This is useful when certain values are not available (e.g., because they have not yet been evaluated on target hardware).

Knowledge graphs and embeddings are built upon many iterations of evaluations, using collected performance and accuracy results. As more results are stored (e.g., as clustered partial results as shown in FIG. 6A), richer sets of embedding values are stored alongside. They represent the growing body of knowledge that can be used to guide NN model optimization. For each model, tuning parameter, target hardware, and/or other design parameter, the body of knowledge grows to a point that there is sufficient confidence to make an inference based on the correlations of previous partial results. Knowledge graphs and embeddings may be stored in local or long-term storage, and can be used to pre-initialize a new system setup at a new facility. A new user or company may also build and update their knowledge database based on their model, dataset, and target hardware.

Figure 7:
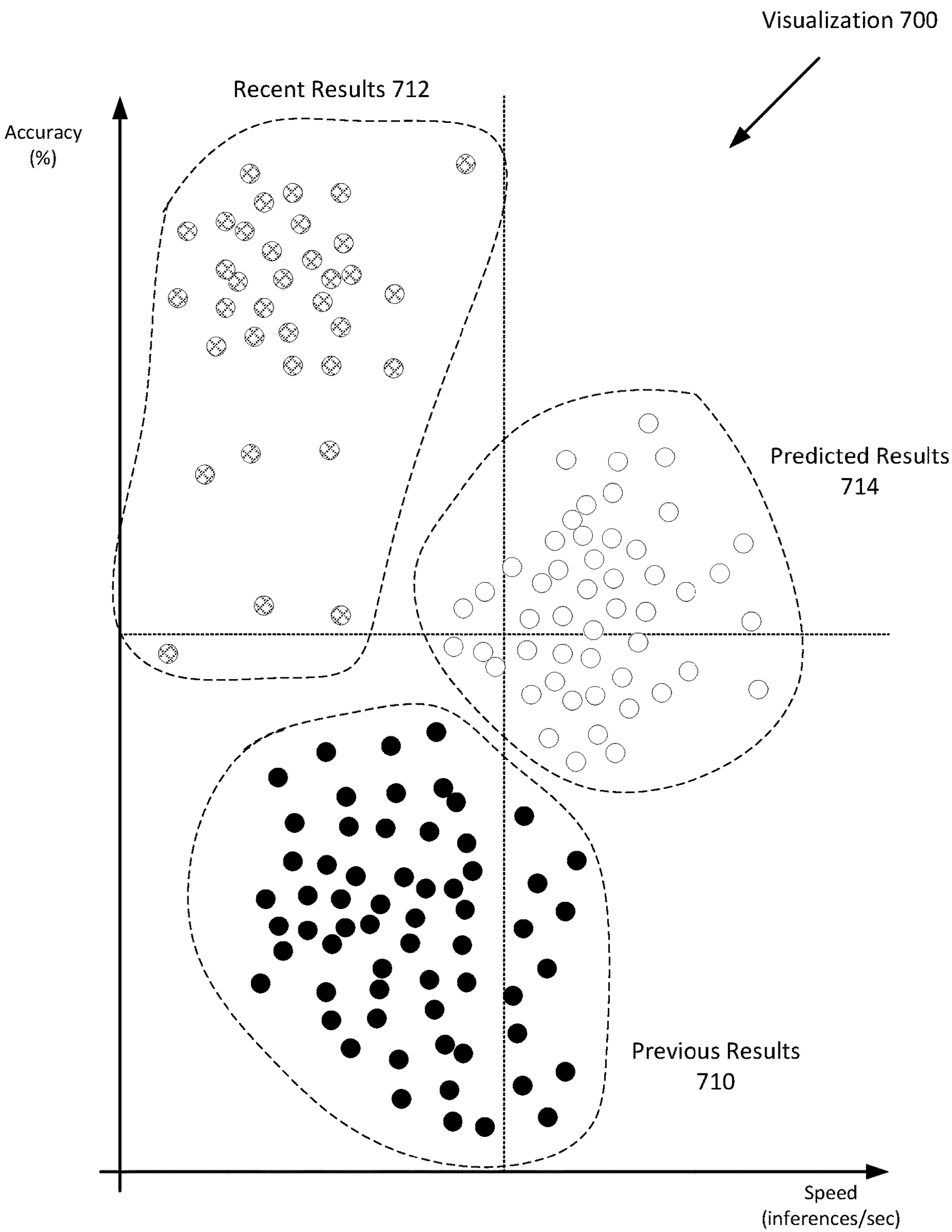
FIG. 7 illustrates a visualization of results of neural network evaluations, in accordance with some embodiments.

Because of the high dimensionality of knowledge graph and embeddings data, the data must be projected into a lower-dimensional space for presentation to a human user. Semantic viewer 532 of system 500 of FIG. 5 provides for such conversion and visualization, as shown in FIG. 7, which is a sample visualization produced by the semantic viewer.

Visualization 700 maps evaluations of neural network models/variants to a two-dimensional space in which the x-axis represents speed (e.g., in number of inferences per second) and the y-axis represents accuracy. Each graphed point represents one evaluation, for either performance (e.g., during a hardware exploration workflow) or accuracy (e.g., during a training workflow). Dotted lines reflect speed and accuracy thresholds sought for an optimized form of a given model or variant, and may be set by a user.

In the illustrated embodiments, the user visualizes results that are captured in batches on target hardware. The color, shape, shading, or other visual characteristic represents the age of the results (previous, recent, and predicted). For example, as shown in visualization 700, results may be separated into previous results 710, recent results 712, and predicted results 714. Previous results 710 are results that were already stored in a knowledge database (or other repository). Recent results 712 are results produced within current and recent workflow iterations, possibly within some discrete timeframe that differs from the timeframe associated with previous results 710. Predicted results 714 are inferred from one or more knowledge graphs, and represent where future results may be situated, based on previous results 710 and recent results 712. An interface may be provided to allow a user to select new experiments (e.g., model architectures and optimization parameters) to explore next, based on this visualization.

However, other visualizations are also possible. For example, in one embodiment, the user may choose to view models with similar architectures (e.g., Yolo) in terms of accuracy and memory size. This visualization can be useful to determine model capacity, and an annotated overlay may be provided to show number of parameters, model layers, training time, and/or other criteria.

Knowledge database 520 and analytics module 530 of system 500 provide a bridge between the machine-learning and embedded systems domains. Each domain uses a different vocabulary and syntax to describe essentially the same type of processing related to NN inference processing. For example, in the machine-learning domain, inference processing is defined as layered operators operating on tensors (e.g., conv2d refers to a two-dimensional convolution on input tensors and filter weights). In the embedded systems domain, inference processing is defined as multiply-accumulate (MACC) operations for convolution, as related to the hardware instruction set.

Thus, analogous to language translation, the vocabularies of the ML and embedded system domains are bridged, and evaluation results related to the domains can be presented through semantic viewer 532 using metrics from the ML domain or embedded system domain (e.g., as shown in FIG. 7). The resulting visualization allows new values to be inferred, much as words for completing a sentence may be predicted by what has been written so far. A difference between embodiments described herein and AI (Artificial Intelligence) for natural language processing (NLP) is that the described embodiments cover semantically different domains (i.e., not language-to-language translation). ML and embedded systems are very much dissimilar, requiring much more capability in the KDB and analytics to offer a proper mapping. In a traditional optimization workflow (e.g., as shown in FIG. 1), the hardware model that is static would not be able to properly encode all nuances about the embedded system to provide a truly accurate mapping.

Given the ability of the KDB and analytics module to map disparate domains into a single construct, it is understood that the disclosed embodiments can be used for other purposes beyond NN model optimization within an efficient end-to-end MLOps workflow, particularly in realms where there is only partial data. For example, in cybersecurity and fraud detection, information such as phone calls, email, can be mapped to physical activities and locations in order to interpret data that is suspicious and malicious.

Figure 8:
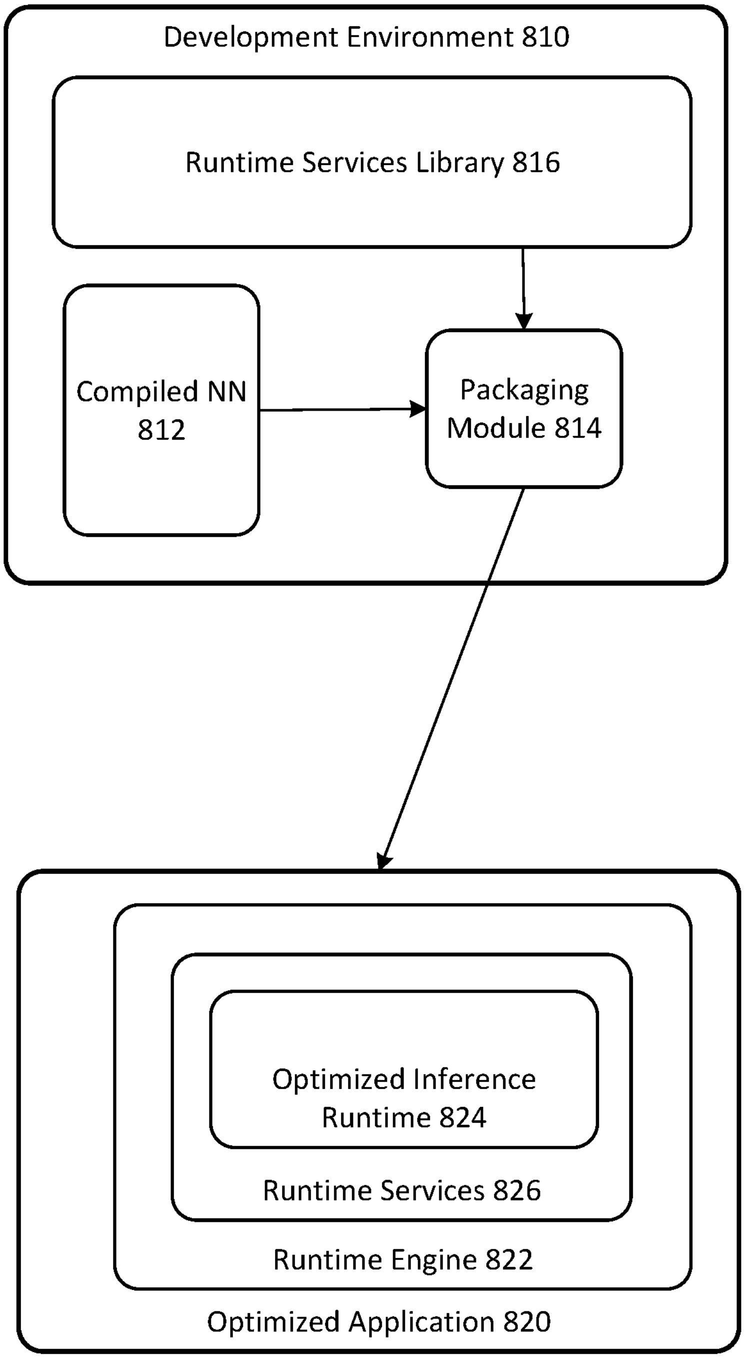
FIG. 8 depicts the enhancement of an optimized neural network with runtime services, to produce an optimized NN application, in accordance with some embodiments.

As shown in FIG. 8, after (or while) a neural network is optimized as described herein, a runtime engine for an optimized application based on the NN is generated by packaging one or more runtime services with a compiled version of the NN. The runtime engine includes the selected services and an optimized inference runtime for computing the necessary mathematical formulas for performing the neural network's inferences.

In FIG. 8, development environment 810, which comprises the training and optimization workflows, yields compiled version 812 of a neural network model. Packaging module 814 packages the compiled version with one or more runtime services selected from runtime services library 816. The packaging module can encapsulate the chosen runtime services around generated runtimes or pre-compiled runtimes, and provides a standardized API (Application Programming Interface) that promotes consistent access, operation, and performance.

Resulting optimized application 820 includes runtime engine 822, which comprises optimized inference runtime (OIR) 824 and the selected runtime services 826. OIR 824, which may be generated by a compiler, provides the basic functionality for running the NN model's inference computations (e.g., convolutions, activations, and/or other mathematical functions).

In different embodiments, runtime services library 816 provides different runtime services for linking with an OIR, but in some embodiments the services can be grouped into four categories: operational, security, query and error handling. Operational runtime services include (a) inference functions such as loading and unloading values into and out of memory, user-defined operations for pre- and/or post-processing (e.g., resizing or scaling input), and running a neural network inference, and (b) continual learning functions such as getting or setting a confidence score threshold and storing input data for later training (e.g., if results are above the confidence score threshold). With reference to system 500 of FIG. 5, scheduler 516 may use operational runtime services to run multiple runtime engines on target hardware, and load and unload selected models for processing on the hardware.

Security runtime services include functions for validating the integrity of a model (e.g., with a CRC (Cyclic Redundancy Check) algorithm), decrypting and authenticating a watermark within a model, and validating authorization for enabling operation of a runtime engine. It should be noted that the parameters for NN models and variants can be stored in a shared library (e.g., in system 500), and accessed by dispatcher 514 when selected. Because measurements of model accuracy are statistical in nature, it can be important to verify that the model has not been altered or compromised. An integrity check can also be useful to check for cyber-attacks, wherein model parameters are altered to change the behavior of the model.

In some embodiments, packaging module 814 inserts a watermark signature within a model's parameters in a way that does not affect the model's operational performance. For example, if a compressed NN model is quantized to 7-bit precision, then the packaging module can insert 1-bit of watermark signature across each model parameter. For a model with 1 million parameters, the watermark signature can store at most 1 million bits. The watermark signature can also be selected based on latency for authenticating the watermark in the target hardware.

Query runtime services deal with model information, and may include functions for collecting runtime engine health information and/or other model metadata, collecting performance metrics (e.g., statistics related to memory, latency, accuracy), and obtaining diagnostic information related to debugging and/or profiling operation of a runtime engine. Scheduler 516 of system 500 can therefore query runtime services to obtain performance metrics to support NN model evaluation. Also, to support multiple variants, dispatcher 514 and scheduler 516 can use the query runtime services to scan a model's metadata, including model origin and UUID (e.g., universal unique identifier for a variant), and/or collect performance metrics, for example, how much time it took to complete the NN inference (e.g., the latency).

Error handling runtime services deal with error conditions and include functions for handling interrupts and/or error/timeout codes, such as by diagnosing related error conditions. Scheduler 516 may use an error handling runtime service if an exception or timeout occurred during operation or evaluation of a neural network model or model variant.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of training and optimizing a machine-learning model, the method comprising:

selecting a machine-learning model for optimization;

generating a set of derived variants of the machine-learning model;

for each of the derived variants:

quantizing numerical parameters within the derived variant; and compiling the derived variant to produce a runtime artifact;

evaluating the set of derived variants for latency within a target hardware architecture to identify one or more derived variants that satisfy a latency criterion;

training only the one or more variants; and evaluating the one or more trained variants for accuracy.

2. The method of claim 1, wherein said generating comprises:

for each of the derived variants, modifying a structure of the machine-learning model in a manner different from other derived variants.

3. The method of claim 1, further comprising:

modifying at least one of quantization and compilation parameters for a target hardware architecture based on results of at least one of the evaluation for latency and the evaluation for accuracy.

4. The method of claim 1, wherein the evaluation for latency tests each of the derived variants regarding one or more of:

inference speed;

storage size;

power; and memory bandwidth.

5. The method of claim 1, wherein the evaluation for accuracy tests each of the one or more trained variants regarding accuracy and at least one of:

training time; and depth and/or width of a configuration of the trained variant.

6. The method of claim 1, further comprising:

after evaluating the derived variants for latency, storing results of the latency evaluation for the one or more trained variants that satisfy the latency criterion; and based on a stored result for a given trained variant, predicting a result of the accuracy evaluation of the given trained variant prior to performing the accuracy evaluation.

7. A method of generating a machine-learning runtime, the method comprising:

compiling a machine-learning model into an optimized inference runtime;

quantizing the machine-learning model;

inserting a watermark signature into the optimized inference runtime;

selecting one or more software functions from a software library;

linking the selected software functions; and generating a single runtime engine comprising the optimized inference runtime and the linked software functions.

8. The method of claim 7, wherein the one or more software functions include:

a cyclic redundancy check algorithm to determine an integrity of the machine-learning model.

9. The method of claim 7, wherein the watermark signature is selected based on:

a bit precision of the quantized machine-learning model; and a latency of the machine-learning model when executed on a target hardware platform.

10. A non-transitory computer-readable medium storing instructions that, when executed by a processor, cause the processor to perform a method of training and optimizing a machine-learning model, the method comprising:

selecting a machine-learning model for optimization;

generating a set of derived variants of the machine-learning model;

for each of the derived variants:

quantizing numerical parameters within the derived variant; and compiling the derived variant to produce a runtime artifact;

evaluating the set of derived variants for latency within a target hardware architecture to identify one or more derived variants that satisfy a latency criterion;

training only the one or more variants; and evaluating the one or more trained variants for accuracy.

11. Apparatus for optimizing a machine-learning model, the apparatus comprising:

one or more processors;

a pool of embedded hardware devices for evaluating a set of variants of the machine-learning model in terms of latency;

a set of graphics processing units (GPUs) for training only a subset of the set of variants that satisfy a latency criterion;

a dispatch module comprising logic executed by the one or more processors to select variants of the machine-learning model for evaluation; and a scheduler module comprising logic executed by the one or more processors to schedule each selected variant for:

latency evaluation by one or more devices within the pool of embedded hardware devices; and accuracy evaluation by one or GPUs in the set of GPUs.

12. The apparatus of claim 11, wherein a given variant of the machine-learning model can be evaluated by executing the given variant on different combinations of embedded hardware devices.

13. The apparatus of claim 11, further comprising:

a knowledge database configured to store the set of variants of the machine-learning model and results of each latency evaluation and each accuracy evaluation.

14. The apparatus of claim 11, further comprising:

an analytics module comprising logic executed by the one or more processors to predict results of an accuracy evaluation of a given variant based on results of the latency evaluation of the given variant;

wherein the results of the latency evaluation include a speed, size, and power of the given variant.

15. The apparatus of claim 14, wherein the analytics module comprises:

one or more knowledge graphs, wherein each knowledge graph pertains to a variant of the machine-learning model and comprises:

nodes representing evaluations of the variant; and connections between nodes representing relationships between the evaluations represented by the connected nodes; and weighted connections between two or more knowledge graphs that correspond to correlations between the connected knowledge graphs.

16. A system for generating a machine-learning runtime, the system comprising:

one or more processors; and memory storing instructions that, when executed by the one or more processors, cause the system to:

compile a machine-learning model into an optimized inference runtime;

quantize the machine-learning model;

insert a watermark signature into the optimized inference runtime;

select one or more software functions from a software library;

link the selected software functions; and generate a single runtime engine comprising the optimized inference runtime and the linked software functions.

17. The system of claim 16, wherein the one or more software functions include: a cyclic redundancy check algorithm to determine an integrity of the machine-learning model.

18. The system of claim 17, wherein the watermark signature is selected based on:

a bit precision of the quantized machine-learning model; and a latency of the machine-learning model when executed on a target hardware platform.

* * * * *